(12) United States Patent
Nakahara et al.

(10) Patent No.: US 12,276,200 B2
(45) Date of Patent: Apr. 15, 2025

(54) VARIABLE DISPLACEMENT EXHAUST TURBOCHARGER

(71) Applicant: MITSUBISHI HEAVY INDUSTRIES ENGINE & TURBOCHARGER, LTD., Sagamihara (JP)

(72) Inventors: Yuya Nakahara, Tokyo (JP); Toyotaka Yoshida, Tokyo (JP); Yosuke Dammoto, Sagamihara (JP); Yoji Akiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 107 days.

(21) Appl. No.: 17/601,604

(22) PCT Filed: May 9, 2019

(86) PCT No.: PCT/JP2019/018517
§ 371 (c)(1),
(2) Date: Oct. 5, 2021

(87) PCT Pub. No.: WO2020/225898
PCT Pub. Date: Nov. 12, 2020

(65) Prior Publication Data
US 2022/0178271 A1 Jun. 9, 2022

(51) Int. Cl.
*F01D 17/16* (2006.01)
*F02B 37/22* (2006.01)
*F02C 6/12* (2006.01)

(52) U.S. Cl.
CPC ............ *F01D 17/165* (2013.01); *F02B 37/22* (2013.01); *F02C 6/12* (2013.01);
(Continued)

(58) Field of Classification Search
CPC ........ F01D 17/165; F01D 17/14; F01D 17/16; F01D 17/162; F05D 2200/211;
(Continued)

(56) References Cited

U.S. PATENT DOCUMENTS 9,429,033 B2 8/2016 Martin et al.
2007/0175216 A1* 8/2007 Kobayashi ............ F01D 25/162
60/605.1

(Continued)

FOREIGN PATENT DOCUMENTS

DE 10 2014 209 195 A1 11/2014
DE 10 2014 209 196 A1 11/2014
(Continued)

OTHER PUBLICATIONS

International Preliminary Report on Patentability and Written Opinion of the International Searching Authority for International Application No. PCT/JP2019/018517, dated Nov. 18, 2021, with English translation.
(Continued)

*Primary Examiner* — Christopher Verdier
*Assistant Examiner* — Arthur Paul Golik
(74) *Attorney, Agent, or Firm* — Birch, Stewart, Kolasch & Birch, LLP

(57) ABSTRACT

A variable displacement exhaust turbocharger according to at least one embodiment comprises: a plurality of nozzle vanes; an annular drive ring; and a lever plate fitted at one end in a groove portion disposed in the drive ring via a connecting pin portion and connected at another end to each nozzle vane. The value of dimensionless slippage S between the groove portion and the connecting pin portion is equal to or less than 0.0016. The dimensionless slippage S is represented by a certain equation.

9 Claims, 11 Drawing Sheets

(52) U.S. Cl.
CPC .. *F05D 2200/211* (2013.01); *F05D 2200/221* (2013.01); *F05D 2200/261* (2013.01); *F05D 2200/262* (2013.01); *F05D 2200/263* (2013.01); *F05D 2220/40* (2013.01); *F05D 2240/128* (2013.01)

(58) Field of Classification Search
CPC ......... F05D 2200/221; F05D 2200/261; F05D 2200/262; F05D 2200/263; F05D 2220/128; F05D 2220/40; F05D 2240/128; F04D 27/002; F04D 27/0246; F04D 29/462; F02C 6/12
USPC .................................. 415/159–160, 163–166
See application file for complete search history.

(56) References Cited

U.S. PATENT DOCUMENTS

| | | | |
|---|---|---|---|
| 2010/0202874 A1 | 8/2010 | Hayashi et al. | |
| 2011/0138805 A1 | 6/2011 | Barthelet et al. | |
| 2012/0121392 A1* | 5/2012 | Azuma | B60W 20/00 415/151 |
| 2012/0237339 A1 | 9/2012 | Streich et al. | |
| 2014/0169947 A1* | 6/2014 | Tashiro | F01D 17/165 415/146 |
| 2014/0341718 A1 | 11/2014 | Uesugi et al. | |
| 2014/0341719 A1* | 11/2014 | Uesugi | F01D 17/165 415/159 |
| 2017/0276019 A1 | 9/2017 | Akimoto | |
| 2019/0136709 A1* | 5/2019 | King | F01D 17/165 |
| 2019/0338698 A1* | 11/2019 | Jin | F01D 17/105 |

FOREIGN PATENT DOCUMENTS

| | | |
|---|---|---|
| EP | 3 045 877 A1 | 7/2016 |
| JP | 4875802 B2 | 2/2012 |
| JP | 2014-224498 A | 12/2014 |
| JP | 2017-180462 A | 10/2017 |

OTHER PUBLICATIONS

International Search Report for International Application No. PCT/JP2019/018517, dated Jul. 23, 2019.
German Office Action for German Application No. 11 2019 006 997.7, dated Feb. 20, 2024.

* cited by examiner

FIG. 10

|  | $r_p$ | L | r | $\psi$ |
|---|---|---|---|---|
| Example 1 | 3 | 52.5 | 15 | 2.5 |
| Example 2 | 2.25 | 52.5 | 7.5 | 2.5 |
| Comparative Example 1 | 3.12 | 27.21 | 14.79 | 0 |
| Comparative Example 2 | 3.12 | 31.645 | 11.79 | 0 |
| Comparative Example 3 | 10 | 49.06 | 27.3 | 0 |

VARIABLE DISPLACEMENT EXHAUST TURBOCHARGER

TECHNICAL FIELD

The present invention relates to a variable displacement exhaust turbocharger.

BACKGROUND

In an internal combustion engine equipped with a turbocharger, a variable displacement exhaust turbocharger, which can vary the flow passage area for exhaust gas supplied from a spiral scroll passage to a turbine according to the operating conditions of the engine, has been widely used in recent years in order to match the exhaust gas flow rate from the engine with the gas flow rate that is the optimum operating condition for the turbocharger.

The variable displacement exhaust turbocharger is provided with a variable nozzle mechanism to transmit a driving force from an actuator to a nozzle vane via a linkage part to change the blade angle of the nozzle vane.

In such a variable nozzle mechanism, the drive member that drives the nozzle vane has a sliding portion, which causes problems such as wear and sticking of the sliding portion.

For example, the variable displacement exhaust turbocharger disclosed in Patent Document 1 is configured to reduce wear of contact surfaces at the connection portion between a drive ring for changing the blade angle of nozzle vanes and a crank arm for rotating the drive ring.

CITATION LIST

Patent Literature

Patent Document 1: U.S. Pat. No. 9,429,033B

SUMMARY

Problems to be Solved

In the variable displacement exhaust turbocharger disclosed in Patent Document 1, at the connection portion between the drive ring and the crank arm, a drive block disposed in a recess of the drive ring and a forked end of the crank arm are rotatably coupled by a pin. Therefore, compared to the case where the drive ring is configured to be rotated by a member such as a pin fitted in a recess of the drive ring in direct contact with the recess, wear of the contact surfaces can be suppressed, but the number of parts increases.

The variable displacement exhaust turbocharger is generally configured to change the blade angle (opening degree) of a plurality of nozzle vanes by driving a plurality of lever plates attached to the respective nozzle vanes with the drive ring. Therefore, there are sliding portions between the driving ring and each lever plate.

In the case of applying a configuration for reducing wear of the contact surfaces, as described in Patent Document 1, to these sliding portions, multiple parts are required for each sliding portion. Since there are multiple sliding portions, applying the configuration for reducing wear of the contact surfaces to the sliding portions between the driving ring and each lever plate significantly increases the number of parts, complicates the configuration, and increases the cost.

In view of the above, an object of at least one embodiment of the present invention is to provide a variable displacement exhaust turbocharger that can suppress wear with a simple configuration.

Solution to the Problems (1) A variable displacement exhaust turbocharger according to at least one embodiment of the present invention comprises: a plurality of nozzle vanes; an annular drive ring; and a lever plate fitted at one end in a groove portion disposed in the drive ring via a connecting pin portion and connected at another end to each nozzle vane, wherein a value of dimensionless slippage S between the groove portion and the connecting pin portion is equal to or less than 0.0016 when the dimensionless slippage S is represented by the following equation (A):

$$S = \{(L+r_p+r)\cos(\Phi_{mx}+\Psi)\}^{-1}[r\sin\theta_{mx}-(L+r)\sin\Phi_{mx}\times d\Phi/d\theta + \{(L+r)\cos\Phi_{mx} - L - r\cos\theta_{mx}\}\tan\theta_{mx}+\Psi) \\ d\Phi/d\theta] + r_p(1-d\Phi/d\theta)/(L+r_p+r) \quad \text{(A)},$$

where $r$ is a distance between a central position of the connecting pin portion and a rotation center of the nozzle vane, $r_p$ is a radius of the connecting pin portion, $L$ is a distance between a rotation center of the drive ring and the rotation center of the nozzle vane, $\Psi$ is an angle of a wall surface of the groove portion formed to be contactable with the connecting pin portion with respect to a radial direction of the drive ring, $\theta$ is an angle between a line segment passing through the rotation center of the drive ring and the rotation center of the nozzle vane and a line segment connecting the central position of the connecting pin portion to the rotation center of the nozzle vane, $\theta_{mx}$ is a possible maximum value of the angle $\theta$, $\Phi$ is a rotation angle of the drive ring based on an angular position of the drive ring when the angle $\theta$ is 0 degrees, $\Phi_{mx}$ is the rotation angle $\Phi$ when the angle $\theta$ is $\theta_{mx}$, and $d\Phi/d\theta$ in the equation (A) is represented by the following equation (B):

$$d\Phi/d\theta = \{r\cos\theta_{mx} + r\sin\theta_{mx}\tan(\Phi_{mx}+\Psi)\}/[(L+r\cos\theta_{mx})\{1+\tan^2(\Phi_{mx}+\Psi)\} - (L+r)\tan(\Phi_{mx}+\Psi)\{\cos\Phi_{mx}\tan(\Phi_{mx}+\Psi) - \sin\Phi_{mx}\}] \quad \text{(B)}.$$

With the above configuration (1), since the value of dimensionless slippage S represented by the equation (A) is equal to or less than 0.0016, the sliding amount between the groove portion and the connecting pin portion can be suppressed without adding parts, so that wear of the groove portion and the connecting pin portion can be suppressed with a simple configuration.

(2) In some embodiments, in the above configuration (1), the value of dimensionless slippage S is equal to or less than 0.0012.

With the above configuration (2), since the value of dimensionless slippage S represented by the equation (A) is equal to or less than 0.0012, the sliding amount between the groove portion and the connecting pin portion can be further suppressed.

(3) A variable displacement exhaust turbocharger according to at least one embodiment of the present invention comprises: a plurality of nozzle vanes; an annular drive ring; and a lever plate fitted at one end in a groove portion disposed in the drive ring via a connecting pin portion and connected at another end to each nozzle vane, wherein a value of dimensionless slippage S between the groove portion and the connecting pin portion is equal to or less than 0.0016 when the dimensionless slippage S is represented by the following equation (C):

$$S = L(r_p \cos \Phi_{mx} + r \sin \theta_{mx}) / \{(L + r_p + r)(L^2 + r^2 + 2Lr \cos \theta_{mx})^{1/2}\} \quad (C),$$

where r is a distance between a central position of the connecting pin portion and a rotation center of the nozzle vane, $r_p$ is a radius of the connecting pin portion, L is a distance between a rotation center of the drive ring and the rotation center of the nozzle vane, an angle of a wall surface of the groove portion formed to be contactable with the connecting pin portion with respect to a radial direction of the drive ring is 0 degrees, θ is an angle between a line segment passing through the rotation center of the drive ring and the rotation center of the nozzle vane and a line segment connecting the central position of the connecting pin portion to the rotation center of the nozzle vane, $\theta_{mx}$ is a possible maximum value of the angle θ, Φ is a rotation angle of the drive ring based on an angular position of the drive ring when the angle θ is 0 degrees, and $\Phi_{mx}$ is the rotation angle Φ when the angle θ is $\theta_{mx}$.

With the above configuration (3), since the value of dimensionless slippage S represented by the equation (C) is equal to or less than 0.0016, the sliding amount between the groove portion and the connecting pin portion can be suppressed without adding parts, so that wear of the groove portion and the connecting pin portion can be suppressed with a simple configuration.

(4) In some embodiments, in the above configuration (3), the value of dimensionless slippage S is equal to or less than 0.0012.

With the above configuration (4), since the value of dimensionless slippage S represented by the equation (C) is equal to or less than 0.0012, the sliding amount between the groove portion and the connecting pin portion can be further suppressed.

(5) In some embodiments, in any one of the above configurations (1) to (4), the angle $\theta_{mx}$ may be 20 degrees.

(6) In some embodiments, in any one of the above configurations (1) to (5), the angle $\theta_{mx}$ may be the angle θ when the nozzle vanes are fully open.

(7) A variable displacement exhaust turbocharger according to at least one embodiment of the present invention comprises: a plurality of nozzle vanes; an annular drive ring; and a lever plate fitted at one end in a groove portion disposed in the drive ring via a connecting pin portion and connected at another end to each nozzle vane, wherein a wall surface of the groove portion formed to be contactable with the connecting pin portion is oblique to a radial direction of the drive ring so that the wall surface is inclined in a rotation direction of the drive ring to increase opening degree of the nozzle vane as the wall surface goes outward in the radial direction of the drive ring.

As a result of intensive studies by the present inventors, it was found that when the wall surface of the groove portion is oblique to the radial direction of the drive ring as described above, the dimensionless slippage S can be reduced compared to the case where the wall surface of the groove portion is not oblique to the radial direction of the drive ring. Thus, the sliding amount between the groove portion and the connecting pin portion may be suppressed with the above configuration (7).

Advantageous Effects

According to at least one embodiment of the present invention, it is possible to suppress wear of sliding portions in a variable displacement exhaust turbocharger.

BRIEF DESCRIPTION OF DRAWINGS

FIG. 10 is a table showing the size of respective portions in Examples and Comparative Examples.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
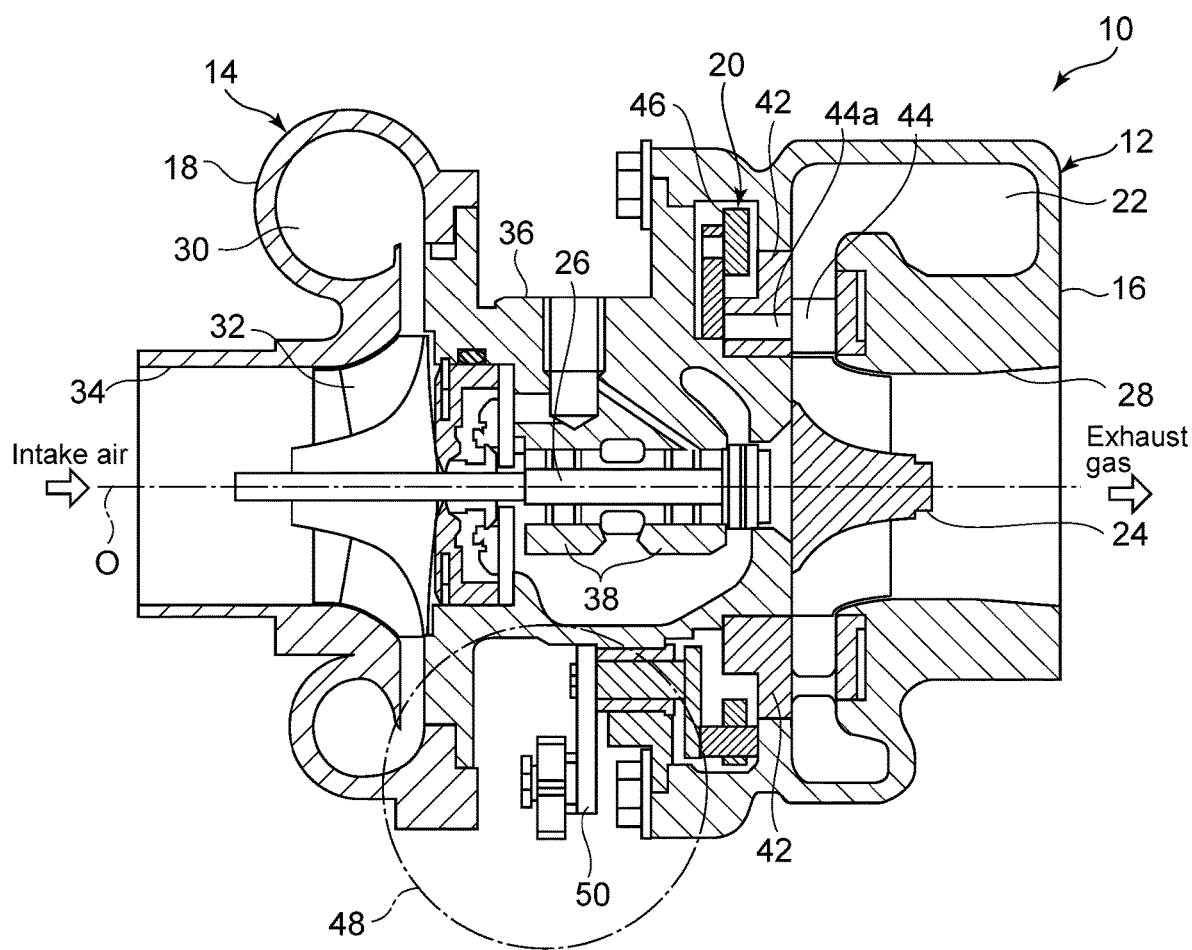
FIG. 1 is a cross-sectional view showing the structure of a variable displacement exhaust turbocharger according to at least one embodiment.

As shown in FIG. 1, a variable displacement exhaust turbocharger 10 according to at least one embodiment of the present invention includes a turbine section 12 driven by exhaust gas introduced from an internal combustion engine (not shown), a compressor section 14 that works in conjunction with the turbine section 12 to pump outside air to the internal combustion engine, and a variable nozzle mechanism 20 disposed in a turbine housing 16 of the turbine section 12 where exhaust gas is introduced.

The turbine housing 16 has a spiral scroll 22 formed in the outer peripheral portion. The scroll 22 communicates with an exhaust port (not shown) of the internal combustion engine. A turbine rotor 24 is disposed in the central portion of the scroll 22. The turbine rotor 24 is fixed to one end of a turbine shaft 26 so as to be rotatable around the axis O of the turbine shaft 26 together with the turbine shaft 26. In the center of the turbine housing 16, an exhaust gas outlet 28 is provided, which opens in the direction along the axis O and is connected to an exhaust pipe (not shown).

The compressor section 14 has a compressor housing 18. The compressor housing 18 has a spiral intake passage 30 formed in the outer peripheral portion. The intake passage 30 communicates with an intake port (not shown) of the internal combustion engine. A compressor 32 is disposed in the central portion of the intake passage 30. The compressor 32 is fixed to the other end of the turbine shaft 26 so as to be rotatable around the axis O together with the turbine shaft 26. In the center of the compressor housing 18, an intake inlet 34 is provided, which opens in the direction along the axis O and is connected to an intake pipe (not shown).

Between the turbine section 12 and the compressor section 14, a bearing housing 36 is disposed. The turbine shaft 26 is rotatably supported by a bearing 38 disposed inside the bearing housing 36.

Figure 2:
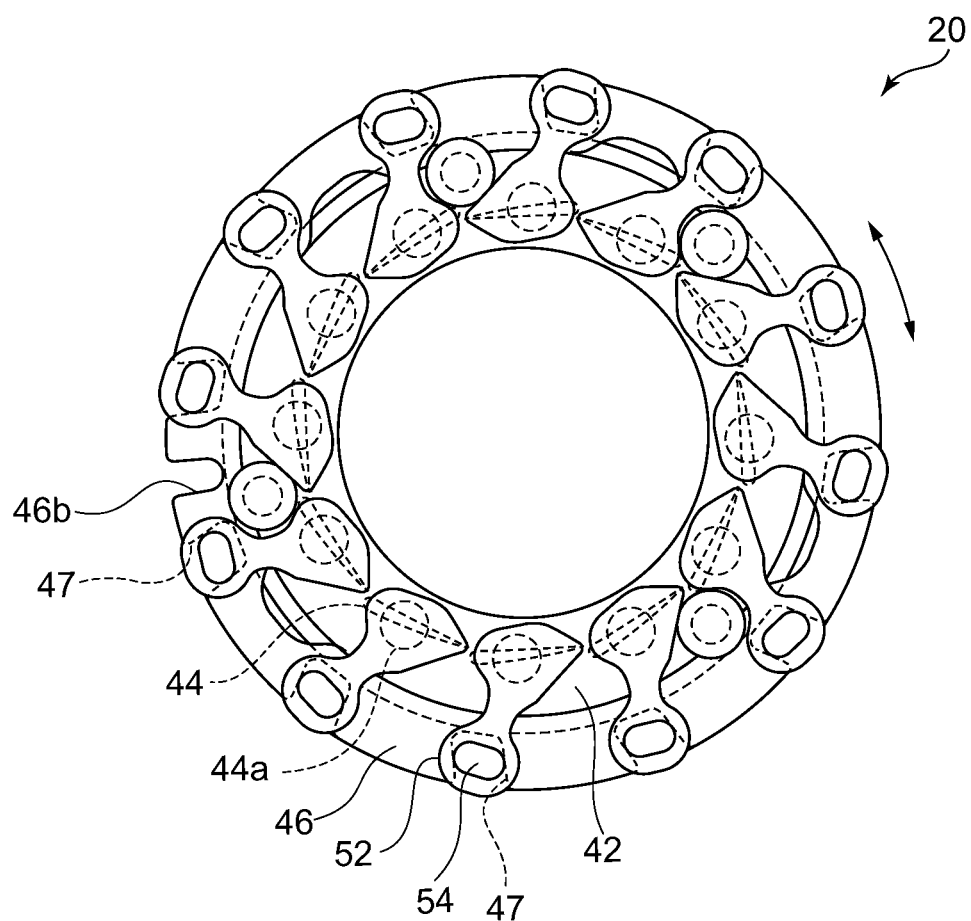
FIG. 2 is a diagram showing a variable nozzle mechanism according to some embodiments.

The variable nozzle mechanism 20 according to some embodiments includes, as shown in FIGS. 1 and 2, a circular nozzle mount 42, a plurality of nozzle vanes 44 rotatably supported at multiple positions along the circumferential direction of the nozzle mount 42, and a drive ring 46 configured to rotate the plurality of nozzle vanes 44. The drive ring 46 is disposed so as to be rotatable relative to the nozzle mount 42 and can rotate the nozzle vanes 44 by applying a driving force to change the blade angle.

The nozzle mount 42 is fixed to the turbine housing 16 by the bearing housing 36 so that the circular center thereof coincides with the axis O inside the turbine housing 16.

The nozzle vanes 44 are disposed in the scroll 22 on the turbine section 12 side of the nozzle mount 42. Each nozzle vane 44 has a nozzle shaft 44a integrally formed, and the nozzle shaft 44a is inserted into a through hole formed in the nozzle mount 42 so that the nozzle vane 44 is supported rotatably around the nozzle shaft 44a.

The drive ring 46 is formed in a circular shape and is supported by the nozzle mount 42 on the bearing housing 36 side of the nozzle mount 42 so that the circular center coincides with the axis O.

In the exemplary embodiment shown in FIG. 1, the drive ring 46 is connected via a link 50 to an operating portion of an actuator 48 fixed to the compressor housing 18.

Further, lever plates 52 are disposed on the bearing housing 36 side of the drive ring 46. A plurality of groove portions 47 are formed on the outer peripheral edge of the drive ring 46 along the circumferential direction. A connecting pin portion 54 disposed at one end of the lever plate 52 is engaged in the groove portion 47, and the other end of the lever plate 52 is connected to the nozzle shaft 44a of the nozzle vane 44. The same number of lever plates 52 as the nozzle vanes 44 are arranged along the circumferential direction of the drive ring 46.

In this configuration, exhaust gas discharged from the internal combustion engine is introduced into the scroll 22 of the turbine section 12 and circulates along the spiral of the scroll 22 to the position of the nozzle vanes 44 of the variable nozzle mechanism 20. Further, the exhaust gas rotates the turbine rotor 24 while passing between the blades of each nozzle vane 44, and is pumped out of the machine through the exhaust gas outlet 28.

Meanwhile, in the compressor section 14, the compressor 32 rotates via the turbine shaft 26 with the rotation of the turbine rotor 24. As the compressor 32 rotates, intake air is introduced into the compressor housing 18 through the intake inlet 34. The introduced air is supercharged into the intake portion (not shown) of the internal combustion engine while being compressed in the intake passage 30.

In the variable nozzle mechanism 20, by driving the actuator 48 to rotate the drive ring 46, the connecting pin portion 54 engaged in the groove portion 47 is driven. This causes each lever plate 52 to pivot and rotate each nozzle vane 44 around the axis (center) A of the nozzle shaft 44a to adjust the blade angle of each nozzle vane 44. As a result, the area of the exhaust gas passage between each nozzle vane 44 is adjusted, and the volume of exhaust gas leading to the turbine rotor 24 is controlled.

In the exemplary embodiment, the outer peripheral edge of the drive ring 46 has a recess 46b configured to engage with the link 50 connected to the operating portion of the actuator 48.

Figure 3:
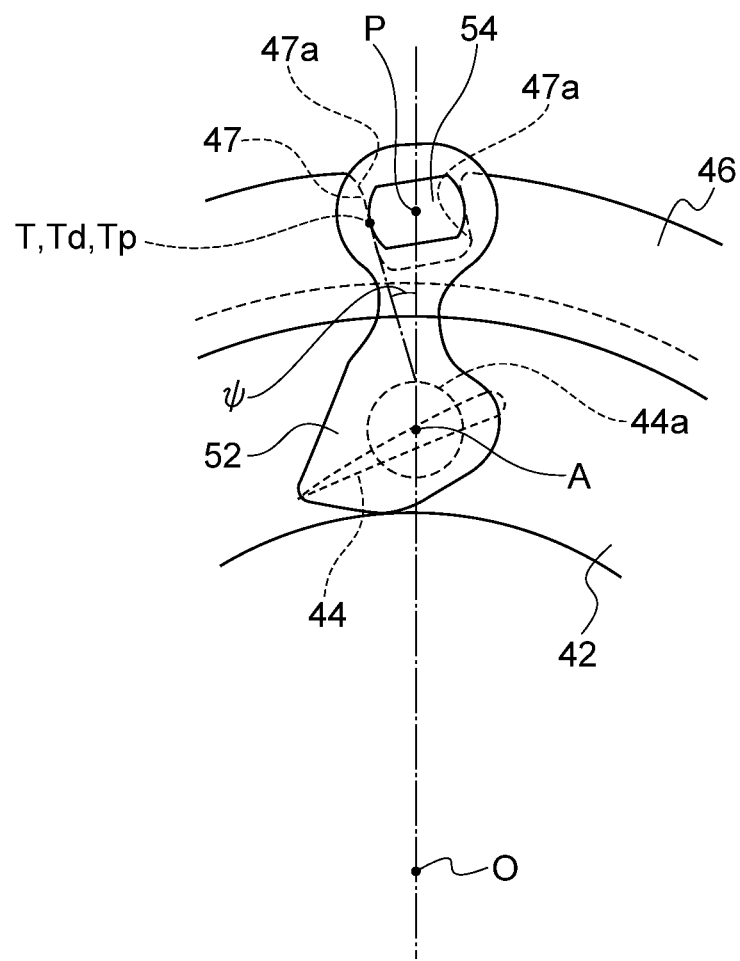
FIG. 3 is an enlarged view of one lever plate and surroundings thereof according to some embodiments.
Figure 4:
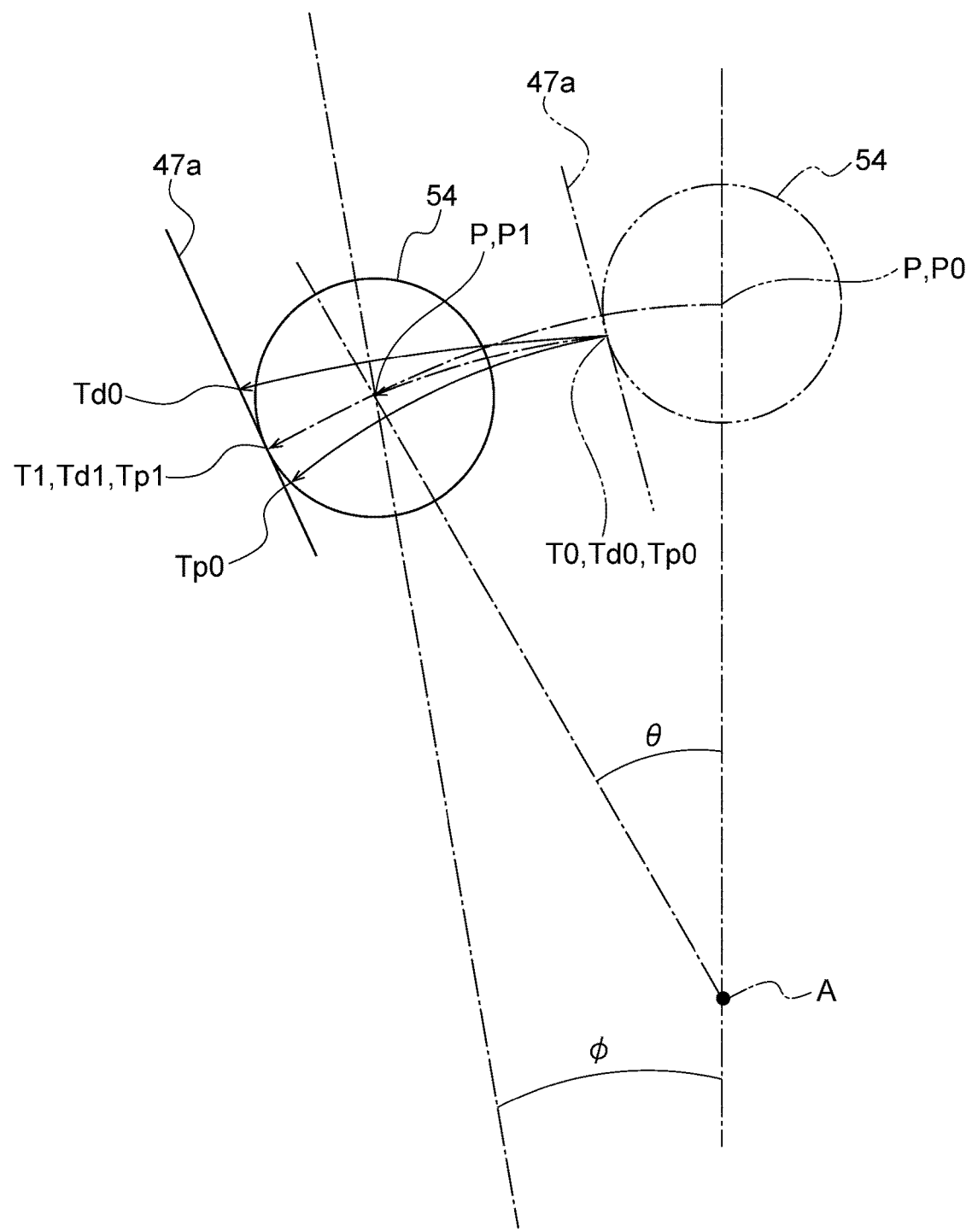
FIG. 4 is a schematic diagram for describing relative slip occurring between the groove portion of the drive ring and the connecting pin portion by rotation of the drive ring.

FIG. 3 is an enlarged view of one lever plate 52 and surroundings thereof according to some embodiments. FIG. 4 is a schematic diagram for describing relative slip occurring between the groove portion 47 of the drive ring 46 and the connecting pin portion 54 by rotation of the drive ring 46. FIG. 3 shows the case where an angle θ between a line segment passing through the axis O, which is the rotation center of the drive ring 46, and the axis A of the nozzle shaft 44a, which is the rotation center of the nozzle vane 44, and a line segment connecting the central position P of the connecting pin portion 54 to the rotation center of the nozzle vane 44 (axis A) is 0 degrees.

In some embodiments, since the axis O, which is the rotation center of the drive ring 46, differs from the axis A of the nozzle shaft 44a, which is the rotation center of the lever plate 52, when the drive ring 46 rotates to move the connecting pin portion 54, relative slip occurs between the groove portion 47 of the drive ring 46 and the connecting pin portion 54.

For example, as shown in FIG. 4, consider the case where the drive ring 46 rotates counterclockwise in FIG. 4 around the axis O, and the lever plate 52 rotates counterclockwise by the angle θ around the axis A of the nozzle shaft 44a. This rotation of the lever plate 52 moves the connecting pin portion 54 from the position shown by the long dashed double-dotted line to the position shown by the solid line in FIG. 4.

The contact point between the groove portion 47 and the connecting pin portion 54 is referred to as contact point T. The contact point T on the groove portion 47 is referred to as ring side contact point Td, and the contact point T on the connecting pin portion 54 is referred to as pin side contact point Tp. Regarding each contact point T, Td, and Tp, the subscript 0 is added to the contact point TT, Td, Tp before the connecting pin portion 54 moves, and the subscript 1 is added to the contact point T, Td, Tp after the connecting pin portion 54 moves.

In the following description, it is assumed that the opening degree of the nozzle vane 44 increases as the drive ring 46 rotates counterclockwise in FIG. 4 around the axis O.

When the connecting pin portion 54 moves from the position shown by the long dashed double-dotted line to the position shown by the solid line, the contact point T between the groove portion 47 and the connecting pin portion 54 moves from the contact point T0 to the contact point T1. At this time, the ring side contact point Td moves on a wall surface 47a from the ring side contact point Td0 to the ring side contact point Td1. Further, the pin side contact point Tp moves on an outer peripheral surface 54a of the connecting pin portion 54 from the pin side contact point Tp0 to the pin side contact point Tp1. Thus, when the drive ring 46 rotates to move the connecting pin portion 54, the contact points of the groove portion 47 of the drive ring 46 and the connecting pin portion 54 with the respective counterparts move, which causes the relative slip as described above.

In order to suppress the wear caused by the relative slip, it is possible to add parts to suppress the amount of slippage caused by the relative slip. However, if parts are added to each of the mating portions of the groove portion 47 of the drive ring 46 and the connecting pin portion 54, whose number is the same as the nozzle plates, the number of parts increases significantly, complicating the configuration and increasing the cost. Therefore, it is desirable to suppress the wear caused by the relative slip without adding any parts.

When the opening degree of the nozzle vanes 44 with the minimum exhaust gas passage between each nozzle vane 44 is defined as 0%, and the opening degree of the nozzle vanes 44 with the maximum exhaust gas passage area between each nozzle vane 44 is defined as 100%, the opening degree with high frequency of use and high operating load in the variable displacement exhaust turbocharger 10 is generally in the range of 60% to 100%. Therefore, if the relative slip can be suppressed within this range, the wear between the groove portion 47 of the drive ring 46 and the connecting pin portion 54 can be effectively suppressed.

As a result of intensive studies by the present inventors, it was found that the amount of slippage due to the relative slip at any opening degree of the nozzle vanes 44 can be suppressed by appropriately adjusting L, r, $r_p$, and $\Psi$, which will be described below. Specifically, when the value of dimensionless slippage S between the connecting pin portion 54 and the groove portion 47 represented by the following equation (A) is equal to or less than 0.0016, the sliding amount between the connecting pin portion 54 and the groove portion 47 can be effectively suppressed without adding parts. Further, when the value of dimensionless slippage S represented by the following equation (A) is equal to or less than 0.0012, the sliding amount between the connecting pin portion 54 and the groove portion 47 can be more effectively suppressed.

$$S=\{(L+r_p+r)\cos(\Phi_{mx}+\Psi)\}^{-1}[r\sin\theta_{mx}-(L+r)\sin\Phi_{mx}\times d\Phi/d\theta+\{(L+r)\cos\Phi_{mx}-L-r\cos\theta_{mx}\}\tan\theta_{mx}+\Psi)d\Phi/d\theta]+r_p(1-d\Phi/d\theta)/(L+r_p+r) \quad (A)$$

Here, $d\Phi/d\theta$ in the equation (A) is represented by the following equation (B).

$$d\Phi/d\theta=\{r\cos\theta_{mx}+r\sin\theta_{mx}\tan(\Phi_{mx}+\Psi)\}/[(L+r\cos\theta_{mx})\{1+\tan^2(\Phi_{mx}+\Psi)\}-(L+r)\tan(\Phi_{mx}+\Psi)\{\cos\Phi_{mx}\tan(\Phi_{mx}+\Psi)-\sin\Phi_{mx}\}] \quad (B)$$

The equations (A) and (B) will be described below in detail.

In the equations (A) and (B), the size and angle of portions of the variable displacement exhaust turbocharger 10 are represented as follows.

r is a distance between the central position P of the connecting pin portion 54 and the rotation center of the nozzle vane 44 (axis A of nozzle shaft 44a).

$r_p$ is the radius of the connecting pin portion 54.

L is a distance between the rotation center of the drive ring 46 (axis O) and the rotation center of the nozzle vane 44 (axis A).

$\Psi$ is an angle of the wall surface 47a of the groove portion 47 formed to be contactable with the connecting pin portion 54 with respect to the radial direction of the drive ring 46 (hereinafter, also referred to as wall surface angle).

$\theta$ is an angle between the line segment passing through the rotation center of the drive ring 46 (axis O) and the rotation center of the nozzle vane 44 (axis A), and the line segment connecting the central position P of the connecting pin portion 54 to the rotation center of the nozzle vane 44 (axis A) (hereinafter, also referred to as lever angle).

$\theta_{mx}$ is a possible maximum value of the lever angle $\theta$, also referred to as maximum lever angle.

$\Phi$ is a rotation angle of the drive ring 46 based on the angular position of the drive ring 46 when the lever angle $\theta$ is 0 degrees (hereinafter, also referred to as drive ring angle).

$\Phi_{mx}$ is the drive ring angle $\Phi$ when the lever angle $\theta$ is the maximum lever angle $\theta_{mx}$, also referred to as maximum drive ring angle.

When the wall surface angle $\Psi$ is 0 degrees, the equation (A) is expressed by the following equation (C).

$$S=L(r_p\cos\Phi_{mx}+r\sin\theta_{mx})/\{(L+r_p+r)(L^2+r^2+2Lr\cos\theta_{mx})^{1/2}\} \quad (C)$$

When the value of dimensionless slippage S between the connecting pin portion 54 and the groove portion 47 represented by the equation (C) is equal to or less than 0.0016, the sliding amount between the connecting pin portion 54 and the groove portion 47 can be effectively suppressed without adding parts. Further, when the value of dimensionless slippage S represented by the equation (C) is equal to or less than 0.0012, the sliding amount between the connecting pin portion 54 and the groove portion 47 can be more effectively suppressed.

The maximum lever angle $\theta_{mx}$ may be, for example, 20 degrees. Further, the maximum lever angle $\theta_{mx}$ may be the lever angle $\theta$ at which the opening degree of the nozzle vanes 44 is maximum (100%).

The derivation of equation (A) will now be described step-by-step.

In the following description, each angle is assumed to be positive in the counterclockwise direction in the figures.

Initially, among the contact points T between the groove portion 47 and the connecting pin portion 54, the position of the pin side contact point Tp is calculated.

Figure 5:
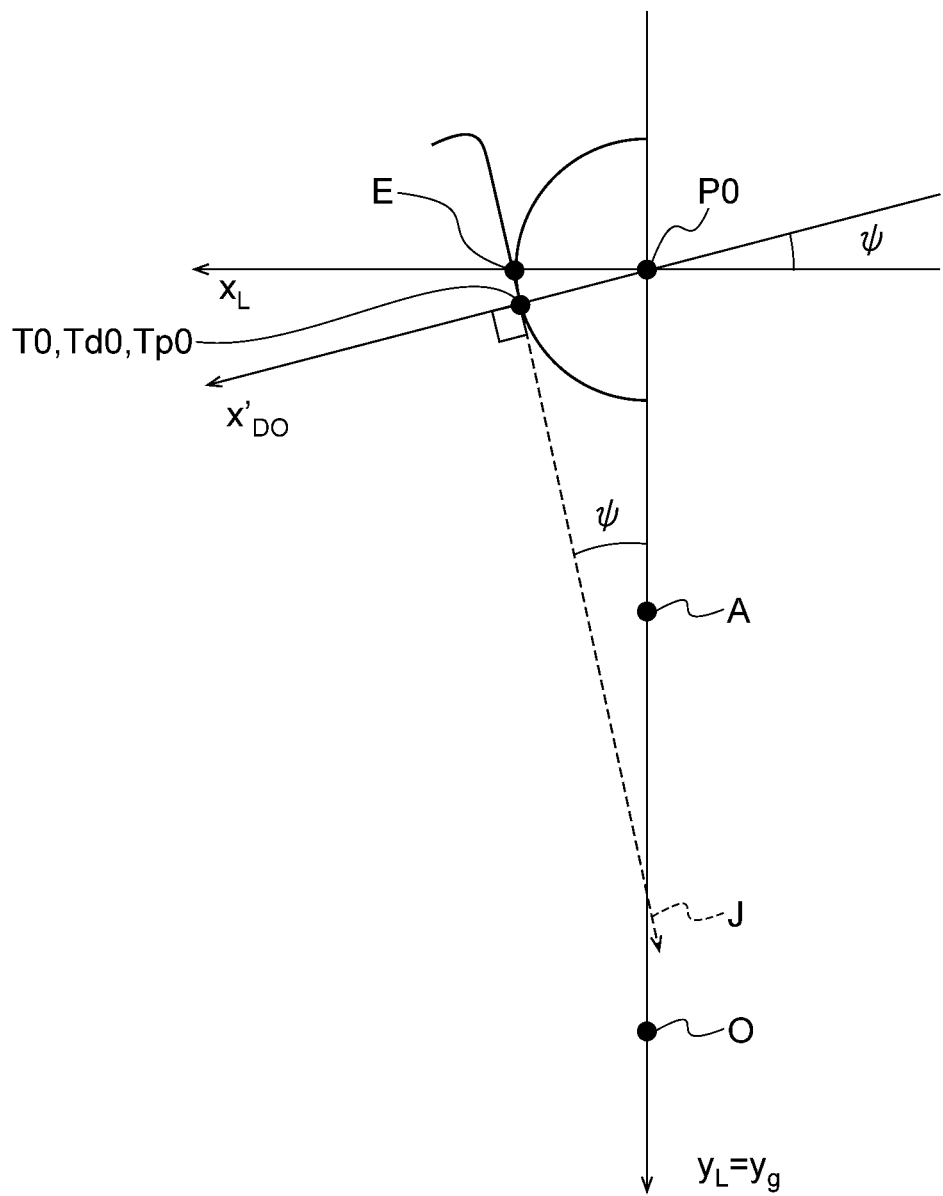
FIG. 5 is a schematic diagram showing a geometric relationship between the connecting pin portion and the groove portion when the lever angle is 0 degrees.

First, consider the case where the lever angle $\theta$ is 0 degrees. FIG. 5 is a schematic diagram showing a geometric relationship between the connecting pin portion 54 and the groove portion 47 when the lever angle $\theta$ is 0 degrees.

In FIG. 5, P0 is the central position of the connecting pin portion 54, and T0 is the contact point between the groove portion 47 and the connecting pin portion 54 as described above. A is the axis of the nozzle shaft 44a, i.e., the rotation center of the nozzle vane 44, and O is the rotation center of the drive ring 46 as described above.

$y_L$ is a straight line connecting P0 and A, and is a coordinate axis fixed to the lever plate 52, with the direction from P0 to A positive. $y_g$ is a straight line connecting P0 and O, and is a coordinate axis fixed to the space, with the direction from P0 to O positive. $\theta$ is an angle between $y_L$ and $y_g$, so when $\theta=0$, the two lines are on the same line. $x_L$ is a coordinate axis perpendicular to $y_L$. E is an intersection between $x_L$ and the outer peripheral surface 54a of the connecting pin portion 54. $x'_{D0}$ is a straight line connecting P0 and T0. J is a straight line extending the wall surface 47a of the groove portion 47. Ψ is an angle between the radial direction of the drive ring 46, more specifically, the meridian of the drive ring 46 passing through the center of the groove portion 47, and the groove portion 47, as described above. That is, Ψ is an angle between J and $y_L$.

Since the slippage on the outer peripheral surface 54a of the connecting pin portion 54 is small displacement of the contact point T, it is expressed by obtaining the coordinates of the contact point T (pin side contact point Tp) and differentiating the coordinates.

(Coordinates of Pin Side Contact Point Tp0)

Since $x_L$ and $y_L$ are coordinate axes fixed to the lever plate 52, point E does not move on the outer peripheral surface 54a of the connecting pin portion 54. Therefore, we express the position of the pin side contact point Tp0 based on point E.

Since angle T0P0A=π/2−Ψ and angle EP0A=π/2, angle EP0T0=Ψ. Therefore, the arc ET0 is $r_p$Ψ. As described above, $r_p$ is the radius of the connecting pin portion 54, P0T0.

$$\text{Arc } ET0 = r_p \Psi \qquad \text{(Eq. 1)}$$

Figure 6:
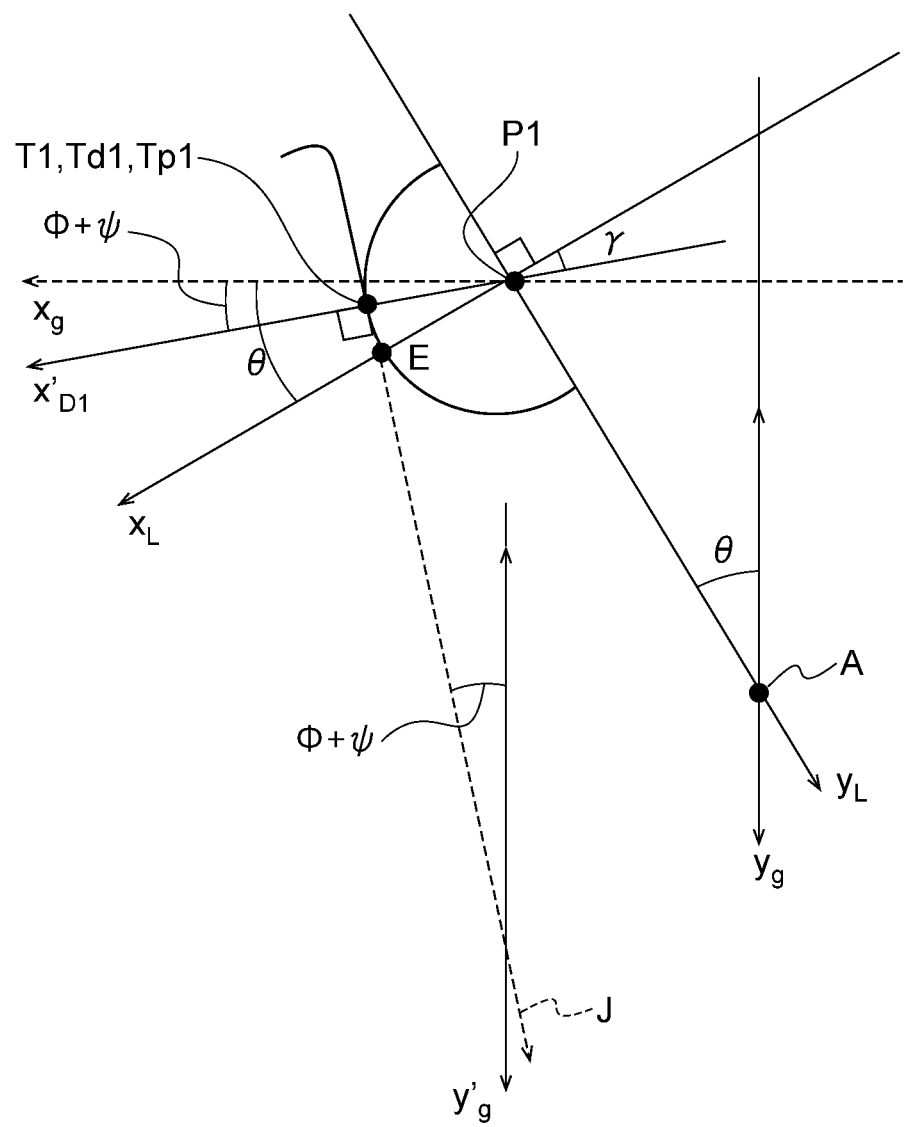
FIG. 6 is a schematic diagram showing a geometric relationship between the connecting pin portion and the groove portion when the lever angle is not 0 degrees.

Next, consider the case where the lever angle θ is not 0 degrees. FIG. 6 is a schematic diagram showing a geometric relationship between the connecting pin portion 54 and the groove portion 47 when the lever angle θ is not 0 degrees.

In FIG. 6, P1 is the central position of the connecting pin portion 54, and T1 is the contact point between the groove portion 47 and the connecting pin portion 54 as described above. $x'_{D1}$ is a straight line connecting P1 and T1. $y'_g$ is a straight line parallel to $y_g$, and is provided for convenience of illustration. γ is an angle between $x'_{D1}$ and $x_L$. $x_g$ is a straight line perpendicular to $y_g$.

Here, the angle between J and $y'_g$ can be expressed as Φ+Ψ. Φ is the drive ring angle based on the angular position of the drive ring 46 when the lever angle θ is 0 degrees, as described above.

(Coordinates of Pin Side Contact Point Tp1)

As in the case of θ=0, we express the position of the pin side contact point Tp1 based on point E. The arc ETp1 can be expressed as $r_p$γ. Here, γ is equal to the angle between $x_g$ and $x_L$ (tentatively referred to as the first angle) minus the angle between $x_g$ and $x'_{D1}$ (tentatively referred to as the second angle).

The first angle is −θ since $x_g$ is perpendicular to $y_g$ and $x_L$ is perpendicular to $y_L$.

The second angle is −(Φ+Ψ) since $x_g$ is perpendicular to $y_g$ and $x'_{D1}$ is perpendicular to J.

The first and second angles are also expressed with counterclockwise from point E positive. That is, γ is Φ+Ψ−θ. Therefore, the arc ETp1 can be expressed as $r_p$(Φ+Ψ−θ) (Eq. 2). This is consistent with θ=0, Φ=0, and (Eq. 1).

$$\text{Arc } ETp1 = r_p(\Phi+\Psi-\theta) \qquad \text{(Eq. 2)}$$

(Pin Side Slippage $ds_L$)

From the above, the pin side slippage $ds_L$, which is the amount of slippage at the outer peripheral surface 54a of the connecting pin portion 54, is $dr_p$(Φ+Ψ−θ).

$$ds_L = dr_p(\Phi+\Psi-\theta) \qquad \text{(Eq. 3)}$$

Next, among the contact points T between the groove portion 47 and the connecting pin portion 54, the position of the ring side contact point Td is calculated.

Figure 7:
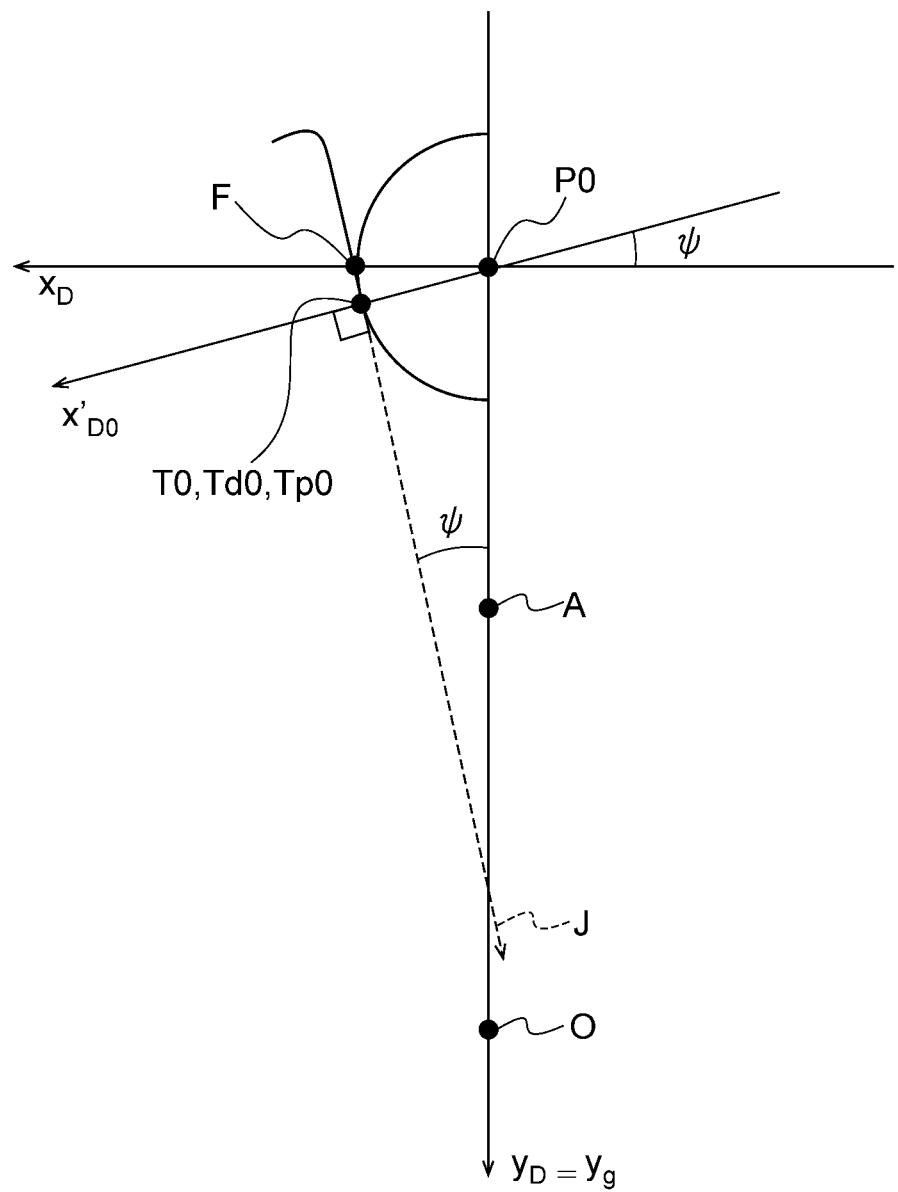
FIG. 7 is a schematic diagram showing a geometric relationship between the connecting pin portion and the groove portion when the lever angle is 0 degrees.

First, consider the case where the lever angle θ is 0 degrees. FIG. 7 is a schematic diagram showing a geometric relationship between the connecting pin portion 54 and the groove portion 47 when the lever angle θ is 0 degrees.

In FIG. 7, $y_D$ is the straight line connecting P0 and O, and is the coordinate axis fixed to the drive ring 46, with the direction from P0 to O positive. Φ is an angle between $y_D$ and $y_g$, so when Φ=0, the two lines are on the same line. $x_D$ is a coordinate axis perpendicular to $y_D$. Point F is an intersection between $x_D$ and the wall surface 47a of the groove portion 47.

Since the groove wall surface side slippage, which is the amount of slippage on the wall surface 47a of the groove portion 47, is small displacement of the contact point T as with the pin side slippage, it is expressed by obtaining the coordinates of the contact point T (ring side contact point Td) and differentiating the coordinates.

(Coordinates of Ring Side Contact Point Td0)

Since $x_D$ and $y_D$ are coordinate axes fixed to the drive ring 46, point F does not move on the wall surface 47a. Therefore, we express the position of the ring side contact point Td0 based on point F.

Since angle Td0P0A=π/2−Ψ and angle FP0A=π/2, angle FP0Td0=Ψ. Since P0T0=$r_p$ and angle FTd0P0=π/2, FTd0 is tan Ψ (Eq. 4).

$$FTd0 = \tan \Psi \qquad \text{(Eq. 4)}$$

Figure 8:
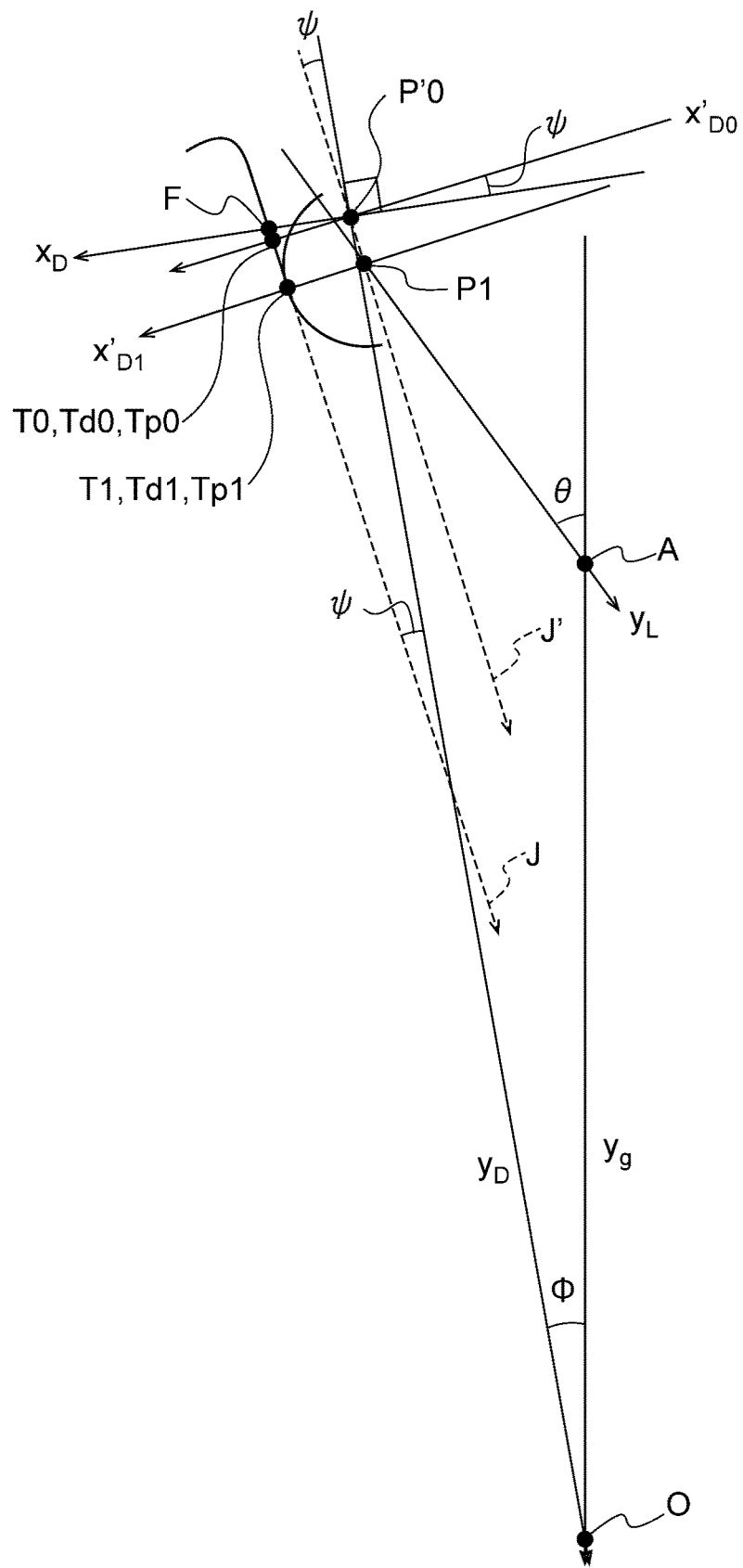
FIG. 8 is a schematic diagram showing a geometric relationship between the connecting pin portion and the groove portion when the lever angle is not 0 degrees.

Next, consider the case where the lever angle θ is not 0 degrees. FIG. 8 is a schematic diagram showing a geometric relationship between the connecting pin portion 54 and the groove portion 47 when the lever angle θ is not 0 degrees.

In FIG. 8, P'0 is a point on the $x_D y_D$ coordinate system at P0 when θ=0 and Ψ=0. J' is the straight line passing through P'0 and P1. Since the connecting pin portion 54 moves along the wall surface 47a and is positioned, J'//J.

(Coordinates of Ring Side Contact Point Td1)

As in the case of θ=0, we express the position of the ring side contact point Td1 based on point E. Since FTd0=tan Ψ from Eq. 4, we obtain Td0Td1.

Here, J is perpendicular to $x'_{D0}$ and J is perpendicular to $x'_{D1}$, and J' is parallel to J. Therefore, Td0Td1=P'0P1.

Then, we obtain P'0P1.

Figure 9:
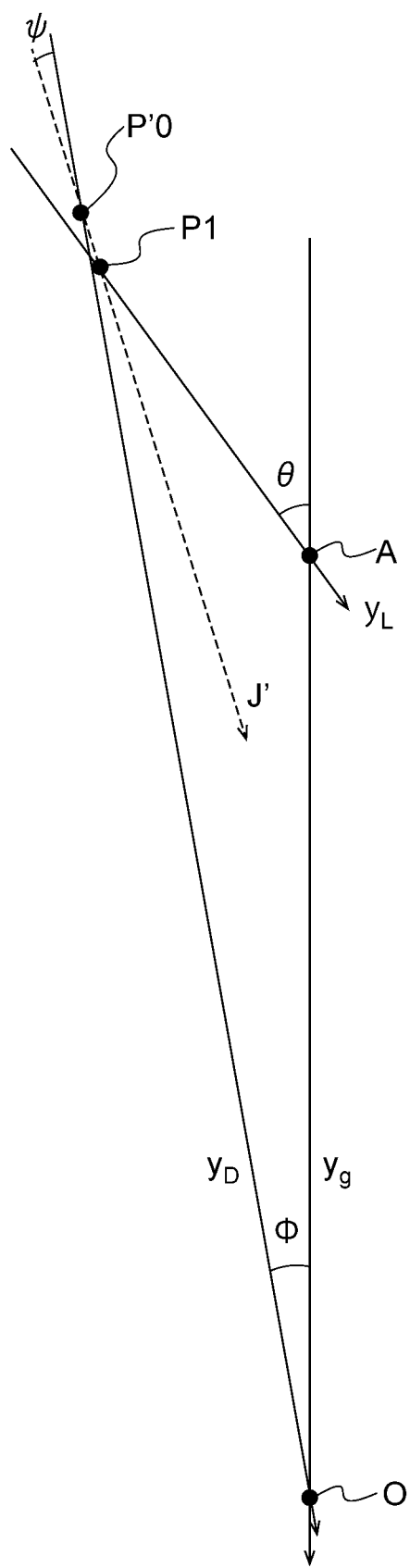
FIG. 9 is a diagram showing a positional relationship required to derive the length k in FIG. 8.

Let k be the length of P'0P1. FIG. 9 is a diagram showing a positional relationship required to derive the length k in FIG. 8. Find k by expressing the coordinates of P1 (on the $x_g y_g$ coordinate system) viewed from O as a vector in two ways, via P'0 and via A.

Since OP0=L+r when θ=0, the vector OP'0 can be expressed as follows:

Vector $OP'0 = (L+r)\sin \Phi, -(L+r)\cos \Phi$, using the fact that $OP'0 = L+r$.

Further, the vectors can be expressed as follows.

Vector $P'0P1 = -k \sin(\Phi+\Psi), k \cos(\Phi+\Psi)$

Vector $OA = 0, -L$

Vector $AP1 = r \sin θ, -r \cos θ$

By coupling these equations, we obtain the following (Eq. 5) and (Eq. 6).

$$(L+r)\sin \Phi + k \sin(\Phi+\Psi) = r \sin \theta \qquad \text{(Eq. 5)}$$

$$(L+r)\cos \Phi + k \cos(\Phi+\Psi) = L + r \cos \theta \qquad \text{(Eq. 6)}$$

By modifying (Eq. 6), we obtain the following (Eq. 7).

$$k = \{(L+r)\cos \Phi - L - r \cos \theta\}/\cos(\Phi+\Psi) \qquad \text{(Eq. 7)}$$

Therefore, FTd1 is FTd0+Td0Td1 and FTd0+P'0P1, i.e., FTd0+k, so Ftd1=tan Ψ+{(L+r)cos Φ−L−r cos θ}/cos(Φ+Ψ). This is consistent with θ=0, Φ=0, and (Eq. 4).

(Groove Wall Surface Side Slippage $ds_D$)

From the above, the groove wall surface side slippage $ds_D$, which is the amount of slippage on the wall surface 47a of the groove portion 47, is represented by the following (Eq. 8).

$$ds_D = d\tan\Psi + d[\{(L+r)\cos\Phi - L - r\cos\theta\}/\cos(\Phi+\Psi)] \quad (\text{Eq. 8})$$

(Calculation of Slippage $ds/d\theta$)

The slippage $ds/d\theta$ per small change $d\theta$ in lever angle $\theta$ is calculated as follows.

The difference between the amount of movement of the contact point T on the outer peripheral surface 54a of the connecting pin portion 54, i.e., the pin side slippage $ds_L$ of the pin side contact point Tp, and the amount of movement of the contact point T on the wall surface 47a, i.e., the groove wall surface side slippage $ds_D$ of the ring side contact point Td, is the net slippage ds.

Assuming that the positive direction of ds is when the connecting pin portion 54 moves and slides along the J direction against the wall surface 47a and when it turns counterclockwise and slides, $ds = ds_D - ds_L$.

Therefore, the slippage $ds/d\theta$ per small change $d\theta$ in lever angle $\theta$ is expressed by the following (Eq. 9).

$$ds/d\theta = ds_D/d\theta - ds_L/d\theta = \quad (\text{Eq. 9})$$
$$d\tan\Psi/d\theta + d[\{(L+r)\cos\Phi - L - r\cos\theta\}/\cos(\Phi+\Psi)]/d\theta -$$
$$dr_p(\Phi+\Psi-\theta)/d\theta =$$
$$d[\{(L+r)\cos\Phi - L - r\cos\theta\}/\cos(\Phi+\Psi)]/d\theta -$$
$$r_p\{(d\Phi/d\theta) - 1\} = [r\sin\theta - \{(L+r)\sin\Phi\}d\Phi/d\theta +$$
$$\{(L+r)\cos\Phi - L - r\cos\theta\}\tan(\Phi+\Psi)(d\Phi/d\theta)]/$$
$$\cos(\Phi+\Psi) + r_p\{1 - (d\Phi/d\theta)\}$$

(Derivation of $d\Phi/d\theta$)

In order to calculate (Eq. 9), it is necessary to find $d\Phi/d\theta$. By substituting (Eq. 5) into (Eq. 7), we obtain the following (Eq. 10).

$$(L+r)\cos\Phi\tan(\Phi+\Psi) + r\sin\theta - (L+r)\sin\Phi = L\tan(\Phi+\Psi) + r\cos\theta\tan(\Phi+\Psi) \quad (\text{Eq. 10})$$

Differentiating and rearranging both sides of (Eq. 10), we obtain the following (Eq. 11).

$$d\Phi/d\theta = \{r\cos\theta + r\sin\theta\tan(\Phi+\Psi)\}/[(L+r\cos\theta)\{1+\tan^2(\Phi+\Psi)\} - (L+r)\tan(\Phi+\Psi)\{\cos\Phi\tan(\Phi+\Psi) - \sin\Phi\}] \quad (\text{Eq. 11})$$

The equation (B) is the equation when $\theta=\theta_{mx}$ and $\Phi=\Phi_{mx}$ in (Eq. 11).

(Nondimensionalization of Slippage $ds/d\theta$)

If the value of the slippage $ds/d\theta$ represented by (Eq. 9) is small, the amount of slippage over the change in lever angle $\theta$ is small. However, in (Eq. 9), since the dimension values of L, $r_p$, and r exist in the numerator, the amount of slippage naturally decreases as the scale of apparatus decreases. Therefore, as an index for the slippage that does not depend on the scale of apparatus, the following (Eq. 12) is obtained by dividing both sides of (Eq. 9) by $(L+r_p+r)$, which is the sum of the dimension values L, $r_p$, and r, to nondimensionalize the equation.

Dimensionless slippage $S=\{(L+r_p+r)\cos(\Phi+\Psi)\}^{-1}[r\sin\theta - (L+r)\sin\Phi\times d\Phi/d\theta + \{(L+r)\cos\Phi - L - r\cos\theta\}\tan(\Phi+\Psi)d\Phi/d\theta] + r_p(1-d\Phi/d\theta)/(L+r_p+r)$ (Eq. 12)

The equation (A) is the equation when $\theta=\theta_{mx}$ and $\Phi=\Phi_{mx}$ in (Eq. 12).

(Case where Wall Surface Angle $\Psi$ is 0 Degrees)

When the wall surface angle $\Psi$ is 0 degrees, the (Eq. 8) and (Eq. 11) can be simplified as the following (Eq. 13) and (Eq. 14), respectively.

$$ds_D = d[\{(L+r)\cos\Phi - L - r\cos\theta\}/\cos\Phi] = \quad (\text{Eq. 13})$$
$$d[L+r-\{(L+r\cos\theta)/\cos\Phi\}]$$

$$d\Phi/d\theta = (r\cos\theta + r\sin\theta\tan\Phi)/ \quad (\text{Eq. 14})$$
$$\{(L+r\cos\theta)(1+\tan^2\Phi) - (L+r)\tan\Phi(\cos\Phi\tan\Phi - \sin\Phi)\} =$$
$$(r\cos\theta + r\sin\theta\tan\Phi)/$$
$$\{(L+r\cos\theta)(1+\tan^2\Phi) - (L+r)\tan\Phi(\sin\Phi - \sin\Phi)\} =$$
$$(r\cos\theta + r\sin\theta\tan\Phi)/\{(L+r\cos\theta)(1+\tan^2\Phi)\}$$

Further, (Eq. 10) can be modified as follows:

$$0 = (L+r)\cos\Phi\tan\Phi + r\sin\theta - (L+r)\sin\Phi - L\tan\Phi - r\cos\theta\tan\Phi =$$
$$(L+r)\sin\Phi + r\sin\theta - (L+r)\sin\Phi - (L+r\cos\theta)\tan\Phi =$$
$$r\sin\theta - (L+r\cos\theta)\tan\Phi$$

Then, we obtain the following (Eq. 15).

$$\tan\Phi = r\sin\theta/(L+r\cos\theta) \quad (\text{Eq. 15})$$

By substituting (Eq. 15) into (Eq. 14), we obtain the following (Eq. 16).

$$d\Phi/d\theta = r(r+L\cos\theta)/(r^2+2rL\cos\theta+L^2) \quad (\text{Eq. 16})$$

From (Eq. 9) and (Eq. 13), we obtain the following (Eq. 17).

$$ds/d\theta = ds_D/d\theta - ds_L/d\theta = \quad (\text{Eq. 17})$$
$$(d/d\theta)[L+r-\{(L+r\cos\theta)/\cos\Phi\}] +$$
$$r_p\{1-(d\Phi/d\theta)\} = (d/d\theta)[-(L+r\cos\theta)/\cos\Phi] +$$
$$r_p\{1-(d\Phi/d\theta)\} = (1/\cos\Phi)$$
$$\{r\sin\theta - (L+r\cos\theta)\tan\Phi(d\Phi/d\theta) +$$
$$r_p\{1-(d\Phi/d\theta)\}$$

By rearranging (Eq. 17) using (Eq. 15), (Eq. 16) and the relationship $1/\cos\Phi = (1+\tan^2\Phi)^{1/2}$, we obtain the following (Eq. 18).

$$ds/d\theta = (1/\cos\Phi)r\sin\theta\{1-(d\Phi/d\theta)\} + r_P\{1-(d\Phi/d\theta)\} = \quad (\text{Eq. 18})$$
$$(r\sin\theta/\cos\Phi + r_P)L(L+r\cos\theta)/(r^2+2rL\cos\theta+L^2) =$$
$$(r\sin\theta/\cos\Phi + r_P)L\cos\Phi/(r^2+2rL\cos\theta+L^2)^{1/2} =$$
$$\{L/(L^2+r^2+2Lr\cos\theta)^{1/2}\}(r_P\cos\Phi + r\sin\theta)$$

The equation (C) is the equation obtained by dividing (Eq. 18), where $\theta=\theta_{mx}$ and $\Phi=\Phi_{mx}$, by $(L+r_p+r)$ for nondimensionalization.

(Wall Surface Angle $\Psi$)

In the above-described embodiments, the wall surface angle $\Psi$ is not 0 degrees. Specifically, in the above-described embodiments, the wall surface 47a of the groove portion 47 may be oblique to the radial direction of the drive ring 46 so that the wall surface 47a is inclined in a rotation direction of the drive ring 46 to increase the opening degree of the nozzle vane 44, i.e., counterclockwise as it goes outward in the radial direction of the drive ring 46.

As a result of intensive studies by the present inventors, it was found that when the wall surface 47a of the groove portion 47 is oblique to the radial direction of the drive ring 46 as described above, the dimensionless slippage S can be reduced compared to the case where the wall surface 47a of the groove portion 47 is not oblique to the radial direction of the drive ring 46. Thus, the sliding amount between the groove portion 47 and the connecting pin portion 54 may be suppressed with the configuration where the wall surface 47a of the groove portion 47 is oblique to the radial direction of the drive ring 46 as described above.

EXAMPLES

Figure 11:
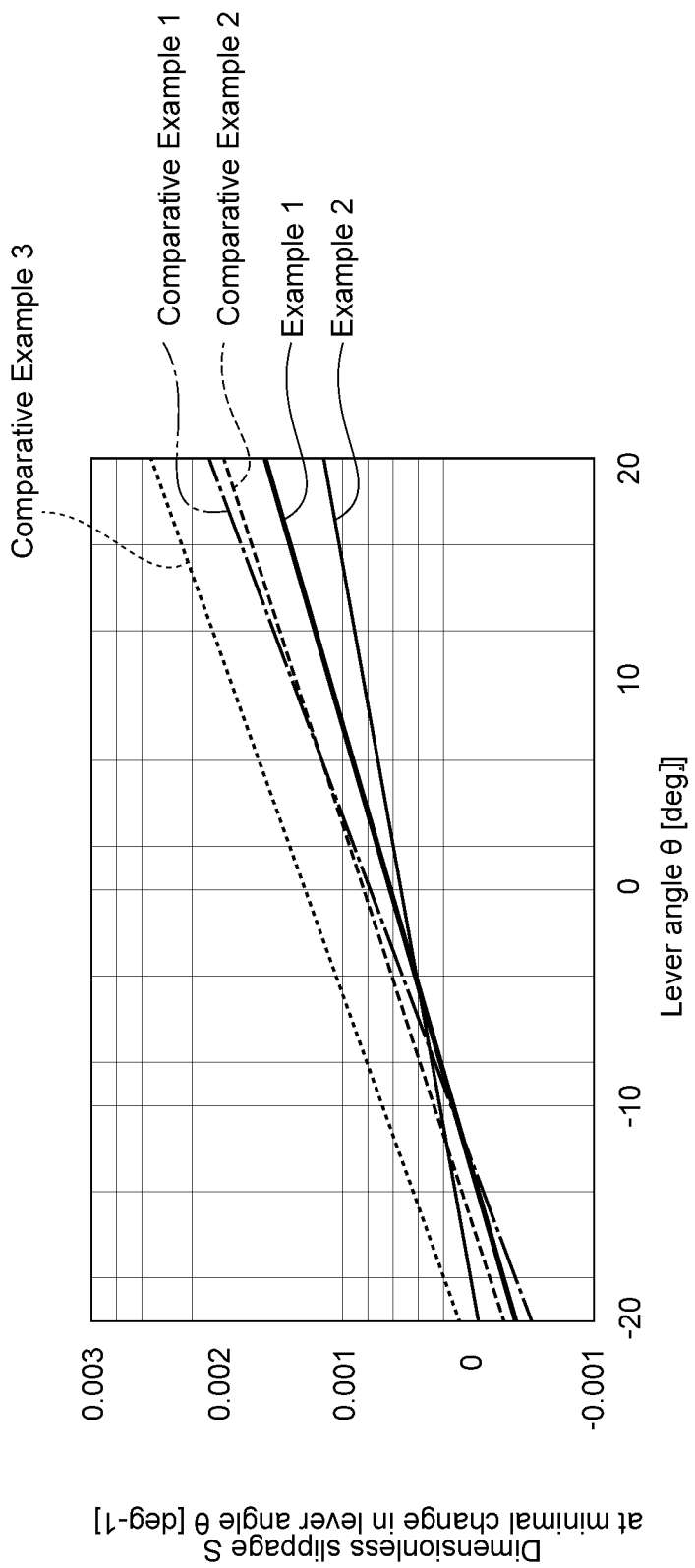
FIG. 11 is a graph of dimensionless slippage S of the variable displacement exhaust turbocharger in which each portion has the size shown in the table of FIG. 10.

FIG. 10 is a table showing the size of respective portions in Examples and Comparative Examples. FIG. 11 is a graph of dimensionless slippage S of the variable displacement exhaust turbocharger in which each portion has the size shown in the table of FIG. 10. In FIG. 11, the horizontal axis is the lever angle θ, and the vertical axis is the value of dimensionless slippage S.

As shown in FIG. 11, in the variable displacement exhaust turbocharger 10 according to Example 1, the value of dimensionless slippage S is equal to or less than 0.0016. In the variable displacement exhaust turbocharger 10 according to Example 2, the value of dimensionless slippage S is equal to or less than 0.0012. In contrast, in the variable displacement exhaust turbocharger according to Comparative Examples 1, 2, and 3, the value of dimensionless slippage S is more than 0.0016.

Therefore, in the variable displacement exhaust turbocharger 10 according to Examples 1 and 2, the sliding amount between the connecting pin portion 54 and the groove portion 47 can be effectively suppressed compared to the variable displacement exhaust turbocharger according to Comparative Examples 1, 2, and 3.

The present invention is not limited to the embodiments described above, but includes modifications to the embodiments described above, and embodiments composed of combinations of those embodiments.

REFERENCE SIGNS LIST

10 Variable displacement exhaust turbocharger
20 Variable nozzle mechanism
42 Nozzle mount
44 Nozzle vane
44a Nozzle shaft
46 Drive ring
47 Groove portion
47a Wall surface
52 Lever plate
54 Connecting pin portion
54a Outer peripheral surface

The invention claimed is:

1. A variable displacement exhaust turbocharger, comprising:
 a plurality of nozzle vanes;
 an annular drive ring; and
 a lever plate fitted at one end in a groove portion disposed in the drive ring via a connecting pin portion and connected at another end to each nozzle vane,
 wherein, for each nozzle vane, a value of dimensionless slippage S between the groove portion and the connecting pin portion is equal to or less than 0.0016 when the dimensionless slippage S is represented by the following equation (A):

$$S=\{(L+r_p+r)\cos(\Phi_{mx}+\Psi)\}^{-1}[r\sin\theta_{mx}-(L+r)\sin\Phi_{mx}\times d\Phi/d\theta+\{(L+r)\cos\Phi_{mx}-L-r\cos\theta_{mx}\}\tan\theta_{mx}+\Psi)d\Phi/d\theta]+r_p(1-d\Phi/d\theta)/(L+r_p+r) \quad (A)$$

where r is a distance between a central position of the connecting pin portion and a rotation center of the nozzle vane,
 $r_p$ is a radius of the connecting pin portion,
 L is a distance between a rotation center of the drive ring and the rotation center of the nozzle vane,
 Ψ is an angle of a wall surface of the groove portion formed to be contactable with the connecting pin portion with respect to a radial direction of the drive ring,
 θ is an angle between a line segment passing through the rotation center of the drive ring and the rotation center of the nozzle vane and a line segment connecting the central position of the connecting pin portion to the rotation center of the nozzle vane,
 $\theta_{mx}$ is a possible maximum value of the angle θ,
 Φ is a rotation angle of the drive ring based on an angular position of the drive ring when the angle θ is 0 degrees,
 $\Phi_{mx}$ is the rotation angle Φ when the angle θ is $\theta_{mx}$, and
 dΦ/dθ in the equation (A) is represented by the following equation (B):

$$d\Phi/d\theta=\{r\cos\theta_{mx}+r\sin\theta_{mx}\tan(\Phi_{mx}+\Psi)\}/[(L+r\cos\theta_{mx})\{1+\tan^2(\Phi_{mx}+\Psi)\}-(L+r)\tan(\Phi_{mx}+\Psi)\{\cos\Phi_{mx}\tan(\Phi_{mx}+\Psi)-\sin\Phi_{mx}\}] \quad (B).$$

2. The variable displacement exhaust turbocharger according to claim 1, wherein the value of dimensionless slippage S is equal to or less than 0.0012.

3. The variable displacement exhaust turbocharger according to claim 1,
 wherein the angle $\theta_{mx}$ is 20 degrees.

4. The variable displacement exhaust turbocharger according to claim 1,
 wherein the angle $\theta_{mx}$ is the angle θ when the nozzle vanes are fully open.

5. A variable displacement exhaust turbocharger, comprising:
 a plurality of nozzle vanes;
 an annular drive ring; and
 a lever plate fitted at one end in a groove portion disposed in the drive ring via a connecting pin portion and connected at another end to each nozzle vane,
 wherein, for each nozzle vane, a value of dimensionless slippage S between the groove portion and the connecting pin portion is equal to or less than 0.0016 when the dimensionless slippage S is represented by the following equation (C):

$$S=L(r_p\cos\Phi_{mx}+r\sin\theta_{mx})/\{(L+r_p+r)(L^2+r^2+2Lr\cos\theta_{mx})^{1/2}\} \quad (C)$$

where r is a distance between a central position of the connecting pin portion and a rotation center of the nozzle vane,
 $r_p$ is a radius of the connecting pin portion,
 L is a distance between a rotation center of the drive ring and the rotation center of the nozzle vane,
 an angle of a wall surface of the groove portion formed to be contactable with the connecting pin portion with respect to a radial direction of the drive ring is 0 degrees, θ is an angle between a line segment passing through the rotation center of the drive ring and the rotation center of the nozzle vane and a line segment connecting the central position of the connecting pin portion to the rotation center of the nozzle vane, $θ_{mx}$ is a possible maximum value of the angle θ, Φ is a rotation angle of the drive ring based on an angular position of the drive ring when the angle θ is 0 degrees, and $Φ_{mx}$ is the rotation angle Φ when the angle θ is $θ_{mx}$.

6. The variable displacement exhaust turbocharger according to claim 5,
wherein the value of dimensionless slippage S is equal to or less than 0.0012.

7. The variable displacement exhaust turbocharger according to claim 5,
wherein the angle $θ_{mx}$ is 20 degrees.

8. The variable displacement exhaust turbocharger according to claim 5,
wherein the angle $θ_{mx}$ is the angle θ when the nozzle vanes are fully open.

9. A variable displacement exhaust turbocharger, comprising:
a plurality of nozzle vanes;
an annular drive ring; and
a lever plate having a connecting pin portion protruding from one end in an axial direction of the drive ring, the connecting pin portion comprising a convex portion, the connecting pin portion extending in the axial direction beyond a surrounding area of the convex portion, the convex portion being fitted in a groove portion disposed in the drive ring via the connecting pin portion, wherein the lever plate is connected at another end to one of the plurality of nozzle vanes,
wherein a straight portion formed in a wall surface of the groove portion and formed to be contactable with the connecting pin portion is oblique to a first radial direction of the drive ring so that the wall surface is inclined in a rotation direction of the drive ring, the first radial direction being defined as a direction passing through a rotation center of the drive ring and a geometric center point of the connecting pin portion, and
wherein an opening amount of the plurality of nozzle vanes is increased by rotating the annular drive ring circumferentially about the rotation center of the drive ring, thereby causing the wall surface and an outer peripheral wall of the connecting pin portion to slip relative to one another.

* * * * *